United States Patent [19]

Murphree

[11] Patent Number: 4,939,698

[45] Date of Patent: Jul. 3, 1990

[54] SONAR SYSTEM

[75] Inventor: Francis J. Murphree, Sunnyside, Fla.

[73] Assignee: The United States of America as represented by the Secretary of the Navy, Washington, D.C.

[21] Appl. No.: 546,474

[22] Filed: Apr. 26, 1966

[51] Int. Cl.⁵ ............................................. G01S 15/00
[52] U.S. Cl. ........................................ 367/88; 367/101
[58] Field of Search .................... 340/3, 3 D, 3 FM, 1; 343/17.1, 17.2; 367/88, 101; 342/25

[56] References Cited

U.S. PATENT DOCUMENTS 3,212,053 10/1965 Finney ................................. 367/101
3,257,638  6/1966 Kritz et al. ......................... 367/101
3,267,416  8/1966 Morse ................................. 367/101

Primary Examiner—Thomas H. Tarcza
Assistant Examiner—Daniel T. Pihulic
Attorney, Agent, or Firm—Sol Sheinbein; John Becker; Harvey David

[57] ABSTRACT

A sonar system having a transmitter for successively broadcasting a pair of acoustical signals having different frequencies, a programmer for determining the times said pair of signals are broadcast, a receiver for receiving said pair of signals after they have been reflected from a target, a programmer for effecting the conversion of said received pair of signals into a continuous unitary electrical signal having variable consecutive time periods which alternately contain the respective frequencies thereof, and a readout for displaying said continuous unitary electrical signal.

10 Claims, 2 Drawing Sheets

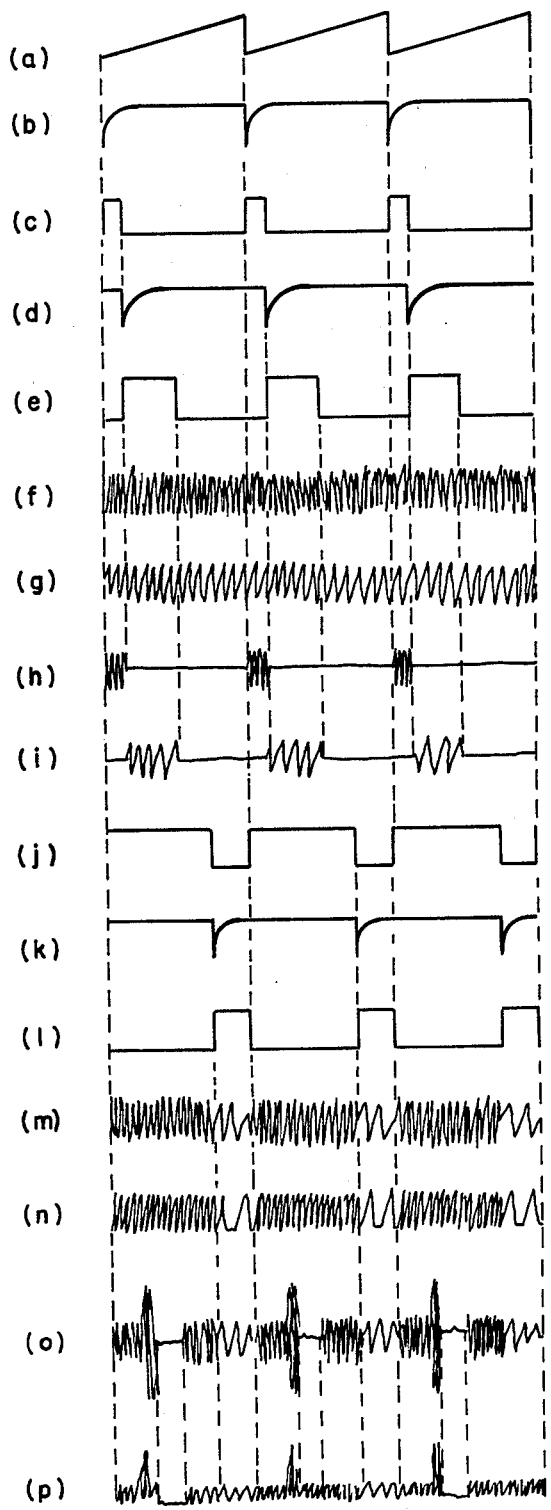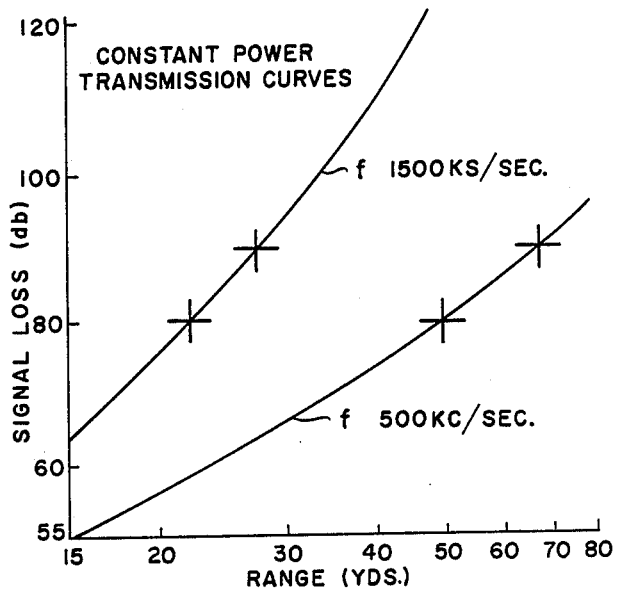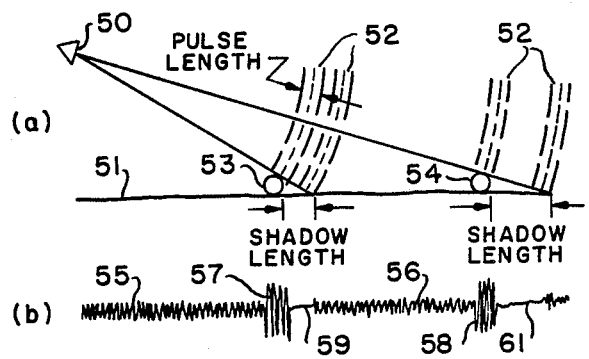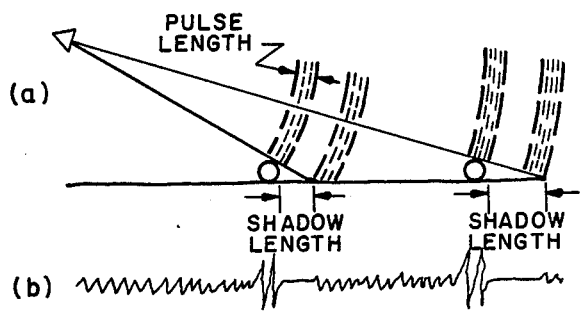

SONAR SYSTEM

The invention described herein may be manufactured and used by or for the Government of the United States of America for governmental purposes without the payment of any royalties thereon or therefor.

The present invention relates in general to echo-searching systems and in particular is a sonar system for locating and identifying underwater targets. In even greater particularly, it is a sonar system of the sidewardly and downwardly scanning or shadowgraph type for locating and identifying various and sundry objects, such as mines or the like, which rest on or are partially submerged in the sea floor.

It is well known in the prior art pulsed shadowgraph type of sonar devices to use short transmitted pulses, the duration of which is selected and fixed in such manner as to provide a desired range resolution, to locate and identify objects laying on the ocean floor. Within the effective operating range of such devices, the scattering from the sea floor is sufficient to override receiver and water noises so that a target resting on the sea floor can be detected both by the echo it returns and the shadow (that is, the lack of reverberation from the bottom immediately behind the target) that it casts. However, at some extreme range, the bottom reverberation signals become very weak and, in some instances, so weak as to be undetectable by the prior art devices. Then, although targets may still be detected, they can only be detected by their highlights. Thus, the identification thereof becomes exceedingly difficult, if not impossible.

Other things remaining the same, sea floor reverberations from the area adjacent to a target can be increased by two procedures:

(1) Increasing the effective height of the transducer above the sea floor and, thus, increasing the grazing angle which, in turn, increases the scattering coefficient; or (2) by increasing the transmitted pulse length and processing the received portions thereon in the manner effected by this invention. In many instances, the former procedure is not practical from an operational standpoint because the depth itself may be a limiting factor when shallow water conditions exist. The latter procedure constitutes an improvement over the prior art devices, inasmuch as it overcomes many of the aforesaid difficulties encountered therewith.

It is, therefore, an object of this invention to provide an improved shadowgraph type of sonar system.

Another object of this invention is to provide a sonar system having improved target detection capabilities at both short and long ranges for any given power output.

Still another object of this invention is to provide a shadowgraph type of sonar system having increased range capabilities.

A further object of this invention is to provide a method and means for increasing the reverberation level of longer search ranges as compared to that obtained at shorter search ranges, thereby increasing the target shadows obtainable at the longer search ranges.

A further object of this invention is to provide a method and means of increasing the target detection range of a sonar system.

Another object of this invention is to provide a sonar system having pulse lengths and frequencies which may be varied as desired as a function of the range being searched at any given instant.

Another object of this invention is to provide an echo-ranging system that produces improved target resolution and shadows, regardless of the type of medium in which it is oprating.

Another object this invention is to provide a shadowgraph type of echo-search system which may be easily and economically manufactured, operated, and maintained.

Other objects and many of the attendant advantages will be readily appreciated as the subject invention becomes better understood by reference to the following detailed description when considered in conjunction with the accompanying drawings wherein:

FIG. 2 is an elevational quasi-pictorial view of the target search procedure and an oscilloscope readout of the signal resulting therefrom when using a high frequency transmission signal;

FIG. 3 is an elevational quasi-pictorial view of the target search procedure an an oscilloscope readout of the signal resulting therefrom when using a transmission signal having a lower frequency and a longer pulse length than are shown in FIG. 2;

FIG. 4 is a graphical illustration of signal loss vs. range for constant power transmission at two different frequencies; and FIG. 5 is an idealized graphical representation of the signal waveforms which emanate from the various and sundry elements of the invention, as it is portrayed in FIG. 1.

Figure 1:
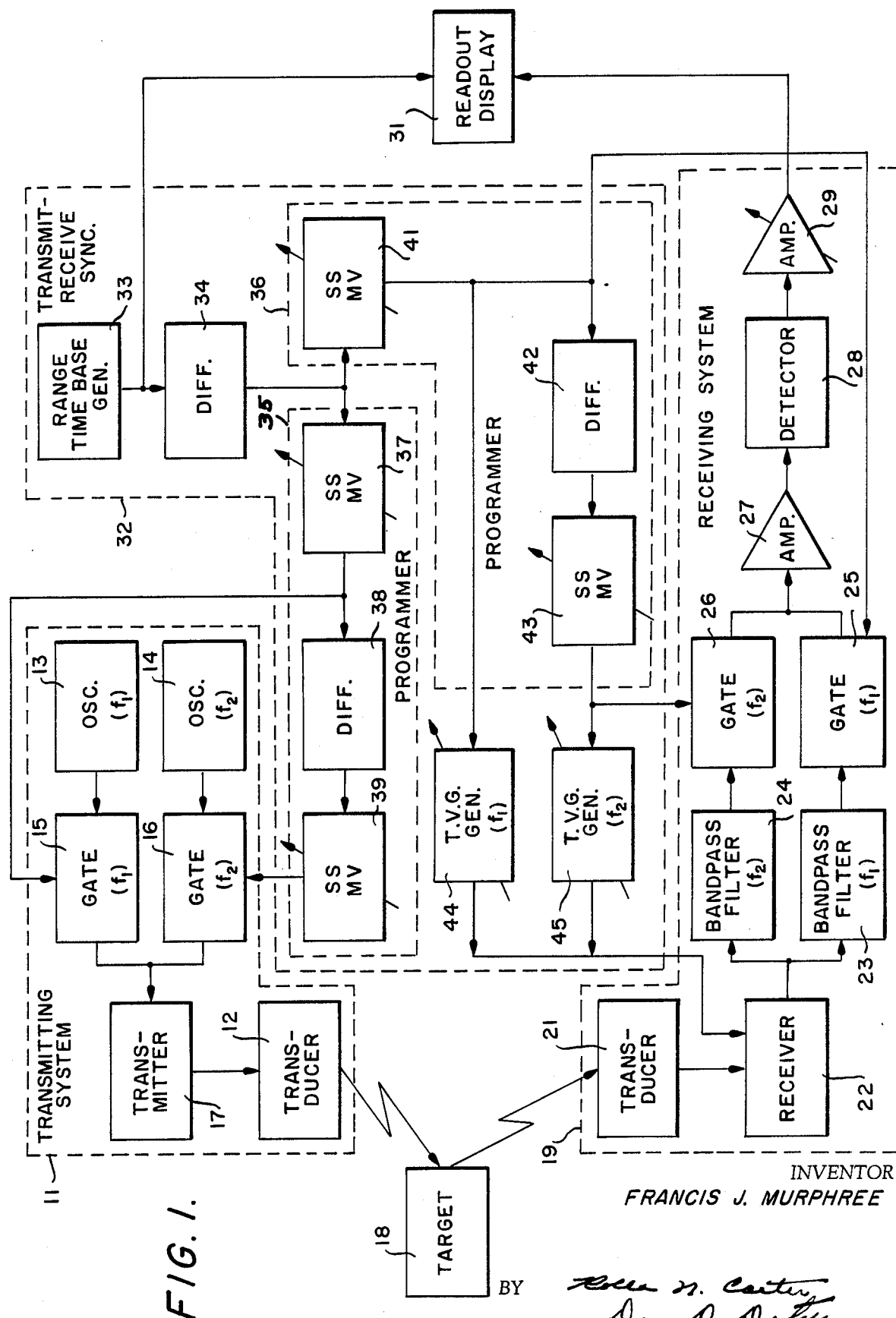
FIG. 1 is a functional block diagram of the subject invention.

Referring now to FIG. 1, there is shown a transmitting system 11 which, in this particular instance, is intended to define as a preferred embodiment sonar transmitting system. Accordingly, transmitting system 11 includes an electroacoustical transducer 12 which is adapted for broadcasting sonic energy throughout a predetermined volume of water and in substantially a predetermined direction.

Included in said transmitting system 11 is an oscillator 13 adapted for supplying an electrical output signal having a frequency of $f_1$ which may, for example, be of the order of 580 kilocycles per second. Another oscillator 14 is included therein which, likewise, supplies an electrical output signal having a frequency $f_2$ of the order of 500 kilocycles per second. The outputs of oscillators 13 and 14 are coupled to the inputs of a pair of gates 15 and 16, respectively, the outputs of which are connected to the input of a transmitter 17. The aforementioned gates 15 and 16 are such that they may be opened and closed by electrical signals applied to the control inputs thereof and, of course, inasmuch as they are respectively connected to the outputs of said oscillators 13 and 14, they perform the functions of gating the $f_1$ and $f_2$ signals produced thereby.

The electroacoustical signal which is broadcast by the aforementioned transducer 12 is projected in this particular case toward a target 18, from which it is reflected as an echo signal back toward a receiving system 19 where it is received by an electroacoustical transducer 21 incorporated therein. The output of electroacoustical transducer 21 is coupled to the input of a receiver 22 which is of the type that its gain may be controlled by another predetermined input signal which will be discussed in greater detail subsequently.

The output of receiver 22 is applied to a bandpass filter 23 which has been designed to pass electrical signals having an $f_1$ frequency. The output of receiver 22 is also applied to the input of another bandpass filter 24 which is adapted for passing those signals having an $f_2$ frequency. The outputs of bandpass filters 23 and 24 are respectively applied to the inputs of a pair of gates 25 and 26 which, of course, are adapted for being opened and closed by predetermined input signals. The outputs of gates 25 and 26 are interconnected and applied to an amplifier 27, the output of which is coupled to a detector 28. The output of detector 28 is, in turn, coupled through a variable gain video amplifier 29 to the input of a readout display device 31 and/or some other appropriate utilization apparatus not shown.

In order to properly correlate the operations of the aforementioned transmitting and receiving systems 11 and 19, a transmit-receive synchronization circuit 32 is employed. Included therein is a range time base signal generator 33 which acts as the basic timing device or clock for the entire sonar system. The output of range time base generator 33 provides the sweep voltage to the aforesaid readout display 31 and is also applied to the input of a differentiator 34. The output of differentiator 34 is then coupled to the inputs of a transmitting programmer 35 and a receiving programmer 36.

Considering first programmer 35, the output from differentiator 34 is actually applied to the input of a single shot multivibrator 37 of the type whose inherent unstable state may be manually controlled as desired to change the period thereof. The output of single shot multivibrator 37 is applied directly to the control input of the aforementioned $f_1$ gate 15 for the timely opening and closing thereof. In addition, the output of single shot multivibrator 37 is also coupled through a differentiator 38 to the input of another single shot multivibrator 39. Again, like single shot multivibrator 37, single shot multivibrator 39 may be manually adjusted to regulate the time period of the inherent unstable state thereof. The output of single shot multivibrator 39 is then applied to the control input of the aforesaid $f_2$ gate 16 for the timely opening and closing thereof.

Considering now the receiving system programmer 36, the output of differentiator 34 is coupled to the input of a single shot multivibrator 41. Single shot multivibrator 41, like the aforesaid single shot multivibrators 37 and 39, is so designed as to be able to manually adjust the time period of its unstable state. The output thereof is directly coupled to the control input $f_1$ gate 25 for the timely opening and closing thereof, and, in addition, it is applied through a differentiator 42 to the input of still another single shot multivibrator 43, the unstable time period of which may also be manually regulated as desired. The output of single shot multivibrator 43 is then coupled to the control input of the aforementioned $f_2$ gate 26 of receiving system 19.

A pair of time-varied gain signal generators 44 and 45 respectively have their inputs connected to the outputs of the aforesaid single shot multivibrators 41 and 43, and the outputs thereof are interconnected and coupled to a gain control input of the aforesaid receiver 22 for timely and appropriately regulating the gain thereof in a manner disclosed more fully below in junction with the disclosure of the operation of the entire invention.

In the foregoing disclosure, the preferred embodiment of the subject invention is indicated as being of the sonar type; therefore, all of the structural elements combined therein are of such character and design that they will broadcast and receive acoustical energy within a subaqueous medium in order to locate and identify underwater targets, such as mines and the like. However, it should be understood that the scope and spirit of this invention will not be violated by designing the disclosed structural elements in such manner as to make their overall combination of the radar type which will locate and identify targets disposed in atmospheric or space type mediums, since so doing would be well within the purview of one skilled in the art having the benefit of the teachings herewith presented. And, of course, it should also be understood the other operational environmental mediums are susceptable to being used too, if so desired, because the principle involved in the subject inventive concept is obviously pertinent thereto.

At this time, it should also be understood that each of the elements disclosed in block form in FIG. 1 are well known and conventional, per se, and that it is their unique interconnections and interactions that causes them to become the new combination constituting this invention.

In order to better understand the actual operation of this invention (which will be fully disclosed later on), the theory of operation thereof will now be discussed briefly.

When operating at long ranges, the length of a shadow which is cast by a mine or other object of approximately the same size which is resting on the bottom of the sea floor is ordinarily much longer than the range resolving capability of a sonar system if said range resolving capability is determined or limited by the length of the transmitted search pulse. Moreover, as long as the pulse length is less than approximately that value which may be calculated from the equation $$l = \frac{2h}{c \sin \theta}, \quad (1)$$

where
 $l =$ pulse length in ft.,
 $h =$ distance the target extends above the sea floor in ft.,
 $c =$ the velocity of sound in water in ft. per sec., and
 $\theta =$ grazing angle in degrees,
the same shadow effect will be effected, assuming the height of target normal to the direction to the acoustical beam is equal to or greater than the beamwidth. On the other hand, in event the transmitted pulse is made longer than that defined by equation (1) above, target identification will be adversely affected due to the fact the reverberation will be received from in front of the target at the same time as it is received from behind the target, thereby diminishing the shadow effect therefrom.

A typical situation, for example, may include a target which extends approximately 18 inches above the sea floor and cast a shadow approximately 10 feet long, if it is located about 100 feet from the sound source at an altitude of 15 feet. This situation seems to suggest that it would be practical to increase bottom reverberations and thus increase the shadow detecting capability of sonar echo-searching devices at the longer ranges by use of longer pulses. For instance, the use of a pulse having a duration of 500 microseconds would increase the reverberation level from around a target by approximately 10 db over that obtained using a 50 microsecond pulse, assuming the transmitted power to be the same in both cases. In addition, a further increase in effective reverberation-to-noise ratio may be obtained when using such length of pulses because receiver bandwidth can be made narrower during the reception thereof. Narrowing the receiver bandwidth, of course, considerably reduces the noise which, in turn, further increases the effective reverberation signal-to-noise ratio. In general, the total improvement may be calculated by the equation $$I_t = 10 \log \frac{t_2}{t_1} + 10 \log \frac{\beta_1}{\beta_2}, \quad (2)$$

where
  $I_t$ = total relative improvement in reverberation in db,
  $t_1$ = the length of the short pulse,
  $t_2$ = the length of the long pulse,
  $\beta_1$ = the receiver bandwidth required to reproduce the $t_1$ pulses with accepted fidelity,
  $\beta_2$ = the receiver bandwidth required to reproduce the $t_2$ pulses with acceptable fidelity.

Since $$\beta_1 \simeq \frac{1}{t_1} \text{ and } \beta_2 \simeq \frac{1}{t_2}$$

in the usual case, it may be readily seen that $$\frac{\beta_1}{\beta_2} = \frac{t_2}{t_1}. \quad (3)$$

Accordingly, it may also be seen that the bandwidth of the receiver may be reduced in the same proportion that the pulse length is increased. This then results in a net improvement in reverberation-to-noise ratio that is twice as great as that which would occur from an increase in pulse length alone. This increased reverberation-to-noise ratio type of reception, in turn, improves the resolution of the received target image and its ambient reflections and, therefore, effectively extends the sonar detection range.

The extent that the detection range can be increased is a function of the intial effective range of the sonar operating at a pulse length $t_1$ and the mean frequency of the transmitted pulse signal. This is graphically shown in FIG. 2 which is a plot of the total tramsmission loss calculated from the equation $$l = 40 \log r + 2ar \quad (4)$$

where
  L = total signal loss in db,
  r = range in yards,
  a = the at attenuation in db per yard for transmitted signals having a frequency of 500 kilocycles per second and 580 kilocycles per second.

Thus, if it is assumed, for example, that the pulse length is increased by a factor of 3.16 and that the bandwidth is reduced accordingly, the net gain would be 10 db. If the initial conditions were such that the total transmission loss of 80 db could be tolerated, then the effective increase in range would be about 5 yards when using a transmission frequency centered about 580 kilocycles per second and 18 yards when using a transmission signal frequency centered about 500 kilocycles per second. Inspection of the graphical illustration represented by FIG. 4 will disclose that less signal loss occurs as the frequency of the transmitted signal is reduced and, accordingly, range is increased as signal frequency decreases for any given transmission power. Frequencies $f_1$ and $f_2$ are matters of design choice, and selection thereof should be such that they provide optimum operation in any given environmental medium and under the circumstances concerned. However, they should also be selected to have a frequency differences that is sufficient to allow proper separation thereof during their processing in the receiving system of this invention.

While it is well known in the art that reverberation level can be increased by increasing the transmitted power even though a short pulse is used, frequently it is technically difficult or perhaps even impossible to obtain transmission power outputs that are necessary for obtaining effective target-search ranges. This is due to the fact that a level will ultimately be reached for any given situation where maximum peak power cannot be increased further, and where such design limitations, are encountered, further increases in energy radiated must be accomplished by increasing the pulse length as it is done in this invention.

At short ranges, it is well known that short pulses give greater target resolution. Hence, it would appear to be a desirable arrangement for a shadowgraph type sonar device to incorporate a transmit pulse length which is regulated as a function of the search range. Accordingly, in this invention, both a short pulse of frequency $f_1$ and relatively long pulse of frequency $f_2$ have been incorporated therein as a means of optimizing the operation thereof within its maximum echo-ranging capabilities. In addition, incorporated therein is the means for selectively determining the transmission duration for each frequency signal in order to correlate it with its best inherent resolving capabilities within its optimum search range. One way to accomplish this is to transmit a multiple frequency pulse having frequency segments of the desired length to provide the desired range resolution and to tune the receiver portion thereof as a function of range so that the desired pulse length is received at the proper time. The device of FIG. 1, of course, causes these operations to be effected and thereby produces the improved results indicated above.

The operation of the subject invention will now be discussed briefly:

Typically transmission and reception operations are schematically disclosed in FIGS. 2 and 3. Of course, as may readily be seen therefrom, FIG. 2 shows the transmission and reception of acoustical energy that has a higher frequency than that shown as being broadcast in FIG. 3. Because the operations shown in FIGS. 2 and 3 are otherwise the same, only the details of the operation of FIG. 2 will now be discussed.

If, for example, a transmit-receive transducer 50 broadcasts acoustical energy downwardly and outwardly (obliquely) toward the sea floor 51 as shown in FIG. 2(a), a mine 53 and/or a mine 54 may be acquired. Reverberations from the sea floor will echo back to transducer 50, except those which do not occur in the acoustical shadow of said mines. The greater the distance between the transducer and the mine, the longer the shadow that is effected by the mine. But, at some distance determined by the physical characteristics of the sea water, the sea floor, and the frequency of the transmitted acoustical energy, such reverberations and, hence, said acoustical shadows become indistinct, and, thus, they are no longer suitable for mine location and identification purposes. However, until that distance is reached, both reverberations 55 and 56 and target echoes 57 and 58 will be received and displayed on an oscilloscope readout as they are ideally shown in FIG. 2(b). The acoustic shadows which occur behind the targets will appear as low or no amplitude signals 59 and 61.

Because at constant power greater sonar target search distances may be obtained by the use of lower frequency and longer pulse transmitted signals, the broadcast and reception thereof is typically illustrated and displayed in FIGS. 3(a) and (b).

For any given constant transmission power, the curves of FIG. 4 disclose that signal loss is less at the lower transmission frequencies and, therefor, the search-range distance may be increased by using lower frequencies. On the other hand, because better target resolution is obtained from using higher frequencies, some compromise must be made with respect to the frequencies employed at any given distance. However, as is indicated by the objectives of this invention, this compromise may not adversely affect the overall operation thereof an excessive amount, if relatively high frequencies are timely transmitted and received up to ranges where the target and reverberation resolutions reaches some point of diminishing returns and then lower frequencies are timely transmitted and received instead. This is the type of operation that is performed by the device of FIG. 1, so as to obtain more optimum range-resolution results.

As shown in FIG. 1, oscillators 13 and 14 produce signals which contain two different frequencies. These signal frequencies are depicted by representative waveforms of FIG. 5(f) and 5(g), respectively, which are exaggerated somewhat in order to facilitate the disclosure thereof. Although in this present embodiment the preferred $f_1$ and $f_2$ frequencies are considered as being 580 kilocycles per second and 500 kilocycles per second respectively, in order to simplify the operational disclosure to follow, it should be understood that any desired frequencies may be used that permit separation thereof during receiver processing and which will facilitate target search and identification operations during any given operational circumstances. The outputs of said oscillators are timely gated by gates 15 and 16 in such manner and in accordance with a predetermined program to be discussed subsequently before being applied to transmitter 17. At this time, it might be well to note that gates 15 and 16 are alternately opened and closed so that the signals received by transmitter 17 alternately and timely includes frequencies of 580 and 500 kilocycles per second, which are exemplarily shown in FIG. 5(h) and 5(i). Transmitter 17, of course, translates the signals input thereto into signals which are of such power that they will drive electroacoustical transducer 12 which, in turn, broadcasts the acoustical equivalent thereof as a search signal, in an effort to acquire a submarine target not otherwise discernable. The target searched for may be of any type that is found submerged within sea water or the like and, for example, may be natural in character or man-made in character as the case may be. If man-made, it may be a mine, a torpedo, a submarine boat, a navigation transponder, or any other object or objects used in tactical warfare or navigation procedures. For the purpose of facilitating the disclosure of this invention, the target referred to from now on will be a submarine mine which is laying on or partially submerged in the floor of the ocean.

When the acoustical energy broadcast by transducer 12 acquires a target such as target 18, it is reflected back therefrom along with reverberations ambient thereto to electroacoustical transducer 21 of receiving system 19, wherein it is reconverted to electrical energy having waveform characteristics proportional thereto. These signals, included in said acoustical energy, are then processed by broadband receiver 22, which is preferably of the heterodyne type, for the purpose of converting them into signals that are more useful as far as power and voltage level is concerned.

Because, as suggested above, signals having frequencies of $f_1$ and $f_2$ were originally broadcast as search signals, they are likewise timely received as echoes of such; but in addition thereto, as a result of traveling within an inherently noisy medium, namely sea water, it becomes necessary to refine the output signal from receiver 22 in order to delete insofar as possible any spurious signals that may have modulated them during said travel. For this reason, the output signals from receiver 22 are applied to bandpass filters 23 and 24, which are designed to respectively pass the $f_1$ and $f_2$ frequency signals only. As in the aforementioned transmitting system 11, gates 25 and 26 of receiving system 19 are timely opened and closed by a receiving programmer, and this is done in such manner that the longer pulses of $f_2$ do not adversely interfere with the shorter pulse of $f_1$, as will be more fully disclosed in the discussion of transmit-receive synchronization circuit 32 subsequently.

The output signals from gates 25 and 26 are amplified to a more useful level by amplifier 27 before being detected by detector 28 which converts them, including any target signals and reverberation signals occurring therein, into pulsating direct current signals. Such $f_1$ and $f_2$ signals have waveform characteristics similar to those shown in FIG. 5(m) prior to detection by detector 28, if no targets are present. After detection, with no targets present, they appear as shown in the waveform of FIG. 5(n). When a target is present, they appear as shown in FIG. 5(o) and 5(p) before and after detection, respectively. The direct current signals are then amplified again by video amplifier 29, which is preferably adjustable in such manner as to enable a human operator to optimize the level of readout or displayed thereat by readout 31.

It has been found that a cathode ray tube is eminently suitable for being used as readout 31, as far as this invention is concerned; however, it should be understood that any other suitable indicator and/or recorder may be substituted therefor, if warranted by operational circumstances.

As previously mentioned, both the transmitting and receiving system portions of this invention are synchronized as far as operational timing is concerned and this, of course, requires that readout 31 likewise be so correlated in order to display both target echoes and shadow reverberations with sufficient fidelity to be intelligently by a human operator. In order to effect such synchronization, a time base generator such as range time base generator 33 is employed in order to produce a basic timing or clock signal for the entire invention. In this particular case, it has been found to be satisfactory to use a sawtooth signal such as that ideally represented in FIG. 5(a). Accordingly, this sawtooth signal is applied to the horizontal sweep portion of readout 31 so that it will display target range at any given instance in the horizontal coordinate. The sawtooth output signal from range time base generator 33 is also applied to differentiator 34, where it is differentiated into a signal having a waveform similar to that illustrated ideally in FIG. 5(b). This, then, is the signal which is applied to both transmitting and receiving programmers 35 and 36 for the proper timing and correlation thereof.

Considering first transmitting programmer 35, said differentiated signal is applied to the input of single shot multivibrator 37 for the purpose of turning it on and changing the state thereof to the unstable state. As previously indicated, single shot multivibrator 37 should be designed in such manner that the duration of its unstable state may be varied manually as desired by the human operator. Accordingly, the output therefrom contains a signal having the waveform similar to that ideally disclosed in FIG. 5(c), with the positive portion thereof representing that unstable period which may be regulated in such manner as to be lengthened or shortened as necessary. This, then, is the signal that is applied to the control element of gate 15. The output from single shot multivibrator 37 is likewise applied to differentiator 38, where it is converted into a signal having substantially the waveform shown ideally in FIG. 5(d), and this signal is then applied to single shot multivibrator 39 to effectively turn it on and put it into its unstable state for whatever time is inherently designed therein. The output from single shot multivibrator 39 contains the waveform characteristics essentially as ideally disclosed in FIG. 5(e), with the positive portion thereof operative to open gate 16 for that period of time when single shot multivibrator 39 is in its unstable state.

Considering now receiving programmer 36, the output from differentiator 34 is likewise applied to the input of single shot multivibrator 41 for the purpose of turning it on and, thus, changing the state thereof to an unstable state. Like single shot multivibrator 37 of programmer 35, single shot multivibrator 41 of programmer 36 should be designed in such manner that the duration of its unstable state may be varied manually as desired by a human operator. The output from single shot multivibrator 41 is a signal which has a waveform similar to that ideally disclosed in FIG. 5(j), with the positive portion thereof representing that unstable period which may be regulated in such manner as to be lengthened or shortened as necessary or desirable. This, then, is the signal that is applied to the control element of gate 25 for the timely openings and closings thereof. The output from single shot multivibrator 41 is likewise applied to differentiator 42, where it is converted into a signal having substantially the waveform shown ideally in FIG. 5(k). This is the signal that is then applied to single shot multivibrator 43 to effectively turn it on and put it into its unstable state for the time period inherently designed therein for whatever manual adjustment is being used at that particular instant. The output from single shot multivibrator 43 contains signal waveform characteristics essentially as shown in FIG. 5(l), with the positive portion thereof operative to open gate 26 for that period of time that it is in its unstable state.

As suggested above, the positive portions of the waveforms of FIGS. 5(j) and 5(l) may be adjusted by manually adjusting the unstable periods of single-shot multivibrators 41 and 43, respectively. Hence, in this particular disclosure, it is shown that the high frequency ($f_1$) acoustical signal is received and processed for a longer period of time than the low frequency ($f_2$) signal. This is due to the fact that although the high frequency signal is transmitted for a very short period of time relative to the transmission of the low frequency signal and the reverberations thereof from the ocean floor and any target that happens to be lying thereon are continuously reflected back for a period of time which is longer than the transmitted period. This, in turn, is due to the large number of minute reflecting surfaces occurring naturally thereon. Of course, for the same reason, the low frequency ($f_2$) signal is likewise reflected back for a period of time which is longer than the time it was transmitted originally. Hence, in most practical situations, after the secession of the broadcast of the high frequency signals, both the high frequency and low frequency signals may be received simultaneously by receiver transducer 19. These composite signals are then processed further by receiver 22 in order to optimize them from the power and voltage level standpoints, after which they are each filtered out by their respective bandpass filters 23 and 24. The timely gating of these filtered signals then produces a continuous electrical signal having a waveform substantially similar to that shown in FIG. 5(m), and after detection thereof by detector 28, they take on the waveform characteristics essentially as shown in FIG. 5(n). FIG. 5(m) and 5(n), it should be noted, are exemplary waveforms which occur when no target is present, and FIGS. 5(o) and 5(p) are the same waveforms when a target is present.

Because it is normal for the receiver input signal strength to decrease with increased range, it has been found that it is desirable to compensate for this as much as possible by use of time-varied-gain generators 44 and 45. As may readily be seen, the receiver gain is regulated by time-varied-gain generator 44 during the interval when the high frequency ($f_1$) signal is being received and processed by receiving system 19, since time-varied-gain generator 44 is controlled by single shot multivibrator 41. Likewise, since time-varied-gain generator 45 is controlled by the output of single shot multivibrator 43, it compensates the gain of the low frequency ($f_2$) signal at the particular time when it is being received and processed by receiving system 19. Accordingly, the voltage level of both the high and low frequency signals are increased as their reception range is increased and in a manner directly proportional thereto. This, of course, results in signals of more nearly uniform amplitude being processed, regardless of the frequency or the search range thereof. Consequently, the readout thereof by display 31 is considerably improved and, thus, facilitates interpretation thereof by human operator using the invention for target search-range purposes.

It should also be understood that, although the preferred embodiment of the invention disclosed herewith uses only two different exemplary frequency signals and appropriate apparatus for the processing thereof in accordance with the subject inventive concept, any plurality of different frequency signals and associated apparatus for the proper processing thereof in accordance with the subject inventive concept may be used if so desired. So doing would obviously only involve using multiples of similar elements or combinations thereof and, thus, would merely be a matter of design choice. Accordingly, so doing would be well within the purview of one skilled in the art having the benefit of the teachings herewith presented.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A sonar system comprising in combination:

means for alternately transmitting for predetermined consecutive time periods a pair of acoustical signals, each of which has a frequency different from the other;

means for receiving said pair of transmitted acoustical signals after same have been reflected from a target and for converting same into a continuous unitary electrical signal having variable consecutive time periods which alternately contain the frequencies of said pair of acoustical signals;

adjustable means interconnecting said transmitting means and said receiving and converting means for respectively regulating each of the aforesaid variable consecutive time periods in accordance with a given program; and means connected to the output of said receiving and converting means for timely reading out said continuous unitary electrical signal.

2. The device of claim 1 wherein said adjustable means interconnecting said transmitting means and said receiving and converting means for respectively regulating each of the aforesaid variable consecutive time periods in accordance with a given program comprise:

a range time base generator;

a differentiator connected to the output of said range time base generator;

a first programmer means connected between the output of said differentiator and inputs of the aforesaid acoustical signal transmitting means for regulating the time periods said pair of acoustical signals are transmitted thereby; and a second programmer means connected between the output of said differentiator and inputs fo the aforesaid receiving and converting means for regulating the time periods of the pair of signal frequencies contained in said continuous unitary electrical signal.

3. The device of claim 1 wherein said means for alternately transmitting for predetermined consecutive time periods a pair of acoustical signals, each of which has a frequency different from the other comprises:

a first oscillator for generating an electrical signal having a frequency that is the same as the frequency of one of said pair of acoustical signals;

a second oscillator for generating another electrical signal having a frequency that is the same as the frequency of the other of said pair of acoustical signals;

a first gate an input, an output, and a control element for the opening and closing thereof in response to a predetermined signal, with the input thereof connected to the output of said first oscillator;

a second gate having an input, an output and a control element for the opening and closing thereof in response to a predetermined signal, with the input thereof connected to the output of said second oscillator;

a transmitter connected to the outputs of said first and second gates; and an electroacoustical transducer connected to the output of said transmitter.

4. The invention according to claim 3 further characterized by an adjustable means connected to the control elements of said first and second gates for timely supplying said predetermined opening and closing signals thereto in accordance with a selected program.

5. The device of claim 1 wherein said means for receiving said pair of transmitted acoustical signals after same have been reflected from a target and for converting same into a continuous unitary electrical signal having variable consecutive time periods which alternately contain the frequencies of said pair of acoustical signals comprises:

a receiving transducer;

a broadband receiver having a transmission signal input, a gain control input, and an output, with the transmission signal input thereof connected to the output of said receiving transducer;

a first bandpass filter connected to the output of said broadband receiver for passing a signal having the same frequency as one of the aforesaid transmitted acoustical signals;

a second bandpass filter connected to the output of said broadband receiver for passing a signal having the same frequency as the other of the aforesaid transmitted acoustical signals;

a first gate having an input, an output, and a control element for the opening and closing thereof in response to a predetermined signal, with the input thereof coupled to the output of said first bandpass filter;

a second gate having an input, an output, and a control element for the opening and closing thereof in response to another predetermined signal, with the input thereof coupled to the output of said second bandpass filter, and with the output thereof connected to the output of said first gate and adapted for being effectively connected to a readout means.

6. The invention of claim 5 further characterized by a detector effectively connected to the interconnected outputs of said first and second gates and adapted for being effectively connected to a readout means.

7. The invention according to claim 5 further characterized by an adjustable means connected to the control elements of said first and second gates for timely supplying said predetermined opening and closing signals thereto in accordance with a selected program.

8. The device of claim 7 wherein said adjustable means connected to the control elements of said first and second gates for timely supplying said predetermined opening and closing signals thereto in accordance with a selected program comprises:

a range time base generator;

a first differentiator connected to the output of said range time base generator;

a first single-shot multivibrator having an input and an output, with the input thereof connected to the output of said first differentiator, and the output thereof connected to the control element of said first gate;

a second differentiator connected to the output of said first single-shot multivibrator; and a second single-shot multivibrator having an input and an output, with the input thereof coupled to the output of said second differentiator, and the output thereof connected to the control element of said second gate.

9. The invention according to claim 8 further characterized by:

a first time-varied-gain genertor connected between the output of said first single-shot multivibrator and the gain control input of the aforesaid broadband receiver; and a second time-varied-gain generator connected between the output of said second single-shot multivibrator and the gain control input of the aforesaid broadband receiver.

10. An electroacoustical facsimile scanning method comprising the steps of:

transmitting obliquely towards the sea floor for predetermined alternate periods of time a pair of acoustical signals; each of which has a frequency different from the other;

receiving said pair of acoustical signals after same have been reflected from said sea floor;

converting said receiving pair of acoustical signals into a continuous electrical signal having variable consecutive time periods which alternately contain the frequencies of said pair of transmitted acoustical signals;

regulating the duration of each of the aforesaid acoustical signal and electrical signal time periods in accordance with a predetermined program; and reading out and displaying the aforesaid continuous electrical signal on a time basis that is synchronized in a predetermined manner with the aforesaid acoustical signal and electrical signal time period regulation.

* * * * *